E. EDELMANN.
PRESSURE GAGE.
APPLICATION FILED OCT. 25, 1911.
1,322,884. Patented Nov. 25, 1919.
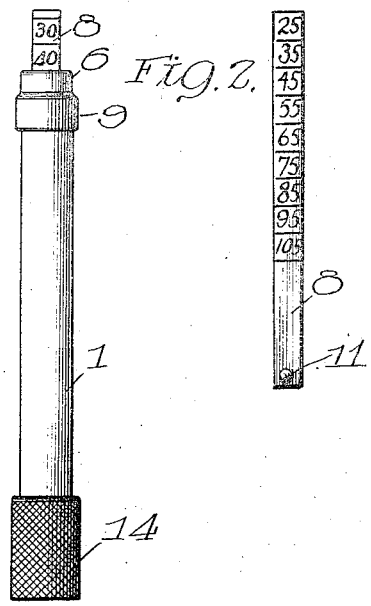
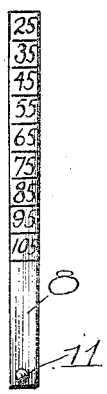
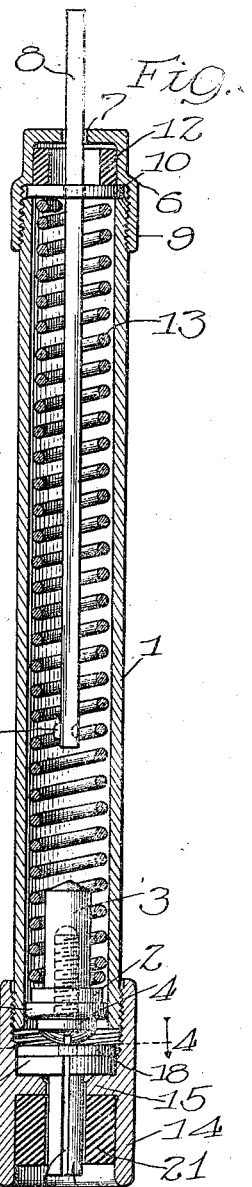
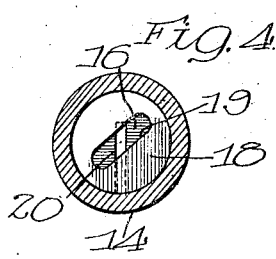
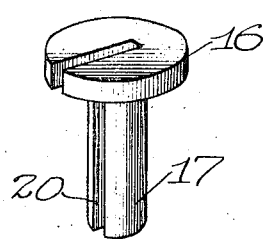
Witnesses:
Inventor:
Erich Edelmann

UNITED STATES PATENT OFFICE.

ERICH EDELMANN, OF CHICAGO, ILLINOIS, ASSIGNOR TO A. SCHRADER'S SON, INC., OF NEW YORK, N. Y., A CORPORATION OF NEW YORK.

PRESSURE-GAGE.

1,322,884.　　　　　　　Specification of Letters Patent.　　　Patented Nov. 25, 1919.

Application filed October 25, 1911. Serial No. 656,704.

*To all whom it may concern:*

Be it known that I, ERICH EDELMANN, citizen of the United States, residing at Chicago, in the county of Cook and State of Illinois, have invented certain new and useful Improvements in Pressure-Gages; and I do hereby declare the following to be a full, clear, and exact description of the invention, such as will enable others skilled in the art to which it appertains to make and use the same.

This invention has for its object to provide a novel construction in a pressure gage particularly adapted for use to read the pressures existing in pneumatic tires, or the like, and consists in the features of construction and combinations of parts hereinafter fully described and claimed.

In the accompanying drawings illustrating the invention:

Figure —1— is a view in side elevation of a pressure gage constructed in accordance with my invention.

Fig. —2— is a view in elevation of the gage bar employed.

Fig. —3— is a central vertical longitudinal section of the tire gage on an enlarged scale.

Fig. 4 is a horizontal section of the same on the line 4—4 of Fig. —3—.

Fig. —5— is a detail perspective view showing a plunger employed.

Fig. —6— is a detail sectional view of the piston actuated by the fluid pressure to impart movement to the gage bar in one direction.

My invention has for its object to provide a small pocket pressure gage which may be carried in the manner of a pencil or fountain pen and may be applied to the inflation tube of a pneumatic tire for the purpose of opening a check valve and admitting the fluid pressure into said gage to move the gage bar to indicate the pressure, the particular object of the present invention being to provide means whereby the gage bar is actuated by the fluid pressure in one direction only and is held frictionally in the position to which it has been moved in order to enable the pressure to be read after removal of the gage from the inflation tube of the tire.

The invention consists more particularly in the combination of details of construction for accomplishing the aforesaid object.

The device comprises a cylindrical casing or tube 1 in which there is longitudinally movable the piston 2 having a centrally disposed stem 3, said piston and stem being provided with a central threaded opening to receive the screw 4 by means of which the cup washer 5 is secured to said piston, the latter forming a fluid-tight joint within the tube around said piston. Mounted upon the upper end of said tube 1 is a cap 6 having a slot 7 in its head through which the flat gage bar 8 projects, the latter being longitudinally movable in the casing and being of considerably less width than the inner diameter of said tube or casing 1. The said cap 6 is provided at its lower end with an annular internally threaded flange 9 of greater diameter than said cap 6 and which receives the upper end of the tube or casing 1. A washer 10 is interposed between the upper end of the tube 1 and the shoulder at the base of the cap 6, said washer being also provided with a slot through which the gage bar 8 passes. The latter is provided at its lower end with a projection 11 to prevent it from being withdrawn through the slot 7. In the cap 6 the rubber washer or collar 12 is disposed which engages the side edge portions of the gage bar 8 to frictionally support the latter at any desired elevation relatively to said tube 1. The helical compression spring 13 interposed between the washer 10 and the piston 2 serves to hold the latter normally at the lower limit of its movement, the said spring also surrounding said gage bar 8 which is freely movable therein.

Secured to the lower end portion of said tube or casing 1 is a sleeve 14 which is provided interiorly between its ends with an annular flange 15. The said annular flange serves practically to divide said sleeve 14 into two compartments, the upper of which communicates with the tube or casing 1. The said upper end portion of said sleeve 14 is interiorly threaded to engage the exterior threads on the lower end of the tube or casing 1. Mounted in said sleeve 14 is a member 16 having a shank 17 passing through the central opening bordered by said annular flange 15, the said member 16 being held in place in the upper end portion of the sleeve 14 by means of a washer 18 provided with a central slot 19, said washer being forced into place and engaging the threads in the upper end portion of said member 14 to hold said member 16 firmly down upon the flange 15 and against upward movement relatively to the member 14. The said member 16 and its shank 17 are provided with a continuous radial slot 20 extending the entire length thereof. Mounted in the lower compartment or end portion of said sleeve 14 is a rubber gasket 21 which surrounds the shank 17 of the member 16 and is preferably of slightly greater diameter than the said lower end portion of said member 14 so as to be required to be forced into said member and adapted to remain firmly secured therein by engagement thereof with the circumferential wall of said sleeve 14.

The operation of the device is as follows:

The lower end portion of the member 14 is of somewhat greater inner diameter than the outer diameter of the inflation tube of the tire and is adapted to receive the latter. By forcing the said device downwardly upon the end of the inflation tube the rubber gasket 21 will be compressed and the shank 17 of the member 16 will be brought to bear upon the stem of the check valve of the tire to open the latter against action of the pressure within the tire. The air thus escaping from the tire will find its way through the slot 20 in the shank 17 and member 16 and through the slot 19 in the washer 18 into the compartment below the piston 2. The fluid pressure will serve to force said piston upwardly against the action of the spring 13 thus raising the gage bar 8. The upper end wall of the cap 6 registers with the graduated scale on said gage bar to indicate the fluid pressure exerted upon the piston 2. After having applied the device to the inflation tube of the tire for a period sufficiently long to enable the gage bar to be moved upwardly the device may be removed from said inflation tube whereupon the spring 13 will return the piston 2 to the lower limit of its movement without, however, retracting the gage bar 8 which is frictionally held in its elevated position by the said washer 12 and is not engaged by the spring 13 or connected with the piston 2. The device may then be held up to the light for the purpose of reading the pressure and after the same has been read said gage bar may be pushed back with the finger whereupon the device is ready for another operation.

The device is very simple and efficient.

I claim as my invention:

1. In a tire gage, a tubular member having at each end means providing a reduced opening one of which is adapted to be connected with a source of fluid pressure, a piston member in the tubular member and adapted to be actuated in one direction by the fluid thus supplied, a spring resisting such movement of said piston member away from said fluid connected end of the tubular member, a gage member movable through the opening in the other end of said tubular member and having thereon a graduated scale adapted to register with said end, packing means secured against longitudinal movement in said tubular member and frictionally engaging said gage member, the latter being capable of movement independently of, but adapted to be moved by said piston member when the latter is actuated by fluid pressure, the gage member in its projected position indicating such pressure, and being frictionally held in such position by said packing means but being adapted to be manually retracted after the return of the piston member.

2. A tire gage comprising a tubular member, a cap for one end of the same having a slot in its head and having an annular internally threaded flange engaging external threads on said member, a washer having a slot interposed between the end of said tube and the shoulder at the base of said flange, a gage bar passing through said slots in said washer and said end wall of said cap respectively, a member frictionally engaging the said gage bar disposed in said cap above said washer, a piston for said tubular member adapted to engage said gage bar to project the same in one direction, a spring interposed between said piston and said washer, and means mounted on the other end of said tubular member for connecting the same with a source of fluid under pressure, said piston adapted, when moved against the action of said spring, to project said bar, the latter held in its projected position by said member frictionally engaging the same and adapted to be manually retracted after the piston has returned to its normal position.

3. A tire gage comprising a tubular member, a cap for one end of the same having a slot in its head and having an annular internally threaded flange engaging external threads on said member, a washer provided with a slot interposed between the end of said tube and the shoulder at the base of said flange, a gage bar passing through said slots in said washer and said end wall of said cap respectively, a rubber gasket disposed in said cap between said washer and the end wall thereof and frictionally engaging said gage bar to hold the same against longitudinal movement relatively to said tubular member, a piston for said tubular member adapted to engage said bar to project the same in one direction, a spring interposed between said piston and said washer, and means mounted on the other end of said tubular member for connecting the same with a source of fluid under pressure, said gasket adapted to hold said bar in the position to which it is projected by said piston, said bar adapted to be manually retracted after the piston has returned to its normal position.

4. A pressure gage for tires, comprising a casing, a pressure-responsive element within said casing, a spring opposing movement of said pressure-responsive element, and a bar indicator element separate from said pressure-responsive element, and adapted to be pressed through said casing by said pressure-responsive element, and a piece of rubber fixed on the casing adapted to contact with said bar for retaining said bar in indicating position.

5. A pressure gage for tires, comprising a casing, a pressure-responsive element within said casing, and a flat bar indicator element separate from said pressure-responsive element, adapted to be pressed through said casing by said pressure-responsive element, and means upon said casing for retaining said indicator bar in indicating position.

6. A pressure gage for tires, comprising a casing, a coupling member adapted to fit upon an end of said casing, a deflating pin having a flange thereon, said coupling member having a flange 15 on the interior thereof, said flange 15 having a shoulder adapted to coöperate with said flange on the deflating pin to prevent outward escape of said pin, said coupling pin being put in place through the inner end of said coupling.

7. A pressure gage for tires, comprising a casing having a deflating pin at one end, said deflating pin having a saw-cut 20 lengthwise thereof, said saw-cut constituting the passage through which air may pass from the exterior to the interior of the gage.

8. A pressure gage for tires, comprising a casing, a coupling member adapted to fit upon an end of said casing, a deflating pin having a flange thereon, said coupling member having a shoulder adapted to coöperate with said flange to prevent outward escape of said pin, said coupling pin being put in place through the inner end of said coupling, and said deflating pin having an air-passage therethrough formed by a saw-cut 20 lengthwise thereof.

9. A pressure gage for tires, comprising a casing, a pressure-responsive piston therein, a coil spring pressing upon the upper side of said piston, an indicator element separate from said piston adapted to be pressed through said casing by said piston for indicating pressures, said indicator element being adapted to project within said coil spring, and said piston having a short projection within said coil spring adapted to contact with said indicator element.

10. A pressure gage for tires, comprising a casing, a pressure-responsive piston therein, a coil spring pressing upon the upper side of said piston, an indicator element separate from said piston adapted to be pressed through said casing by said piston for indicating pressures, said indicator element being adapted to project within said coil spring, said indicator element having means thereon for preventing it from passing entirely from said casing.

In testimony whereof I have signed my name in presence of two subscribing witnesses.

ERICH EDELMANN.

Witnesses:
M. M. BOYLE,
JACOB M. WELLER.